(12) United States Patent
Ewen

(10) Patent No.: US 6,338,350 B1
(45) Date of Patent: Jan. 15, 2002

(54) PORTABLE EYEGLASS WASHING SYSTEM

(76) Inventor: Paul Ewen, 2219 Greenbriar St., Concord, CA (US) 94520

( * ) Notice: Subject to any disclaimer, the term of this patent is extended or adjusted under 35 U.S.C. 154(b) by 0 days.

(21) Appl. No.: 09/375,183

(22) Filed: Aug. 16, 1999

(51) Int. Cl.[7] .................................................. B08B 3/02
(52) U.S. Cl. .................... 134/56 R; 134/95.2; 134/105; 134/102.3; 134/201
(58) Field of Search .................................. 134/115, 200, 134/199, 201, 105, 56 R, 58 R, 57 R, 95.2, 99.1, 102.3, 135

(56) References Cited

U.S. PATENT DOCUMENTS

| 1,292,407 | A | * | 1/1919 | Spicer |
| 3,259,139 | A | * | 7/1966 | Bell et al. |
| 3,327,721 | A | * | 6/1967 | Carlson |
| 3,480,022 | A |   | 11/1969 | Richardson et al. |
| 3,571,939 | A | * | 3/1971 | Paul |
| 4,078,558 | A | * | 3/1978 | Woog et al. |
| 4,157,097 | A | * | 6/1979 | Miya |
| 4,157,922 | A | * | 6/1979 | Luik |
| 4,196,487 | A | * | 4/1980 | Merriman et al. |
| 4,314,766 | A | * | 2/1982 | Lapeyre et al. |
| 4,721,124 | A | * | 1/1988 | Tuerkheimer et al. |
| 4,782,941 | A | * | 11/1988 | Freise |
| 5,143,101 | A | * | 9/1992 | Mor |
| 5,161,559 | A | * | 11/1992 | Yoshihara et al. |
| 5,209,784 | A |   | 5/1993 | Bellman |
| 5,335,394 | A |   | 8/1994 | Cunningham, Jr. et al. |
| 5,472,004 | A | * | 12/1995 | Gilliard |
| 5,515,877 | A | * | 5/1996 | Dunn, Jr. |
| 5,758,675 | A | * | 6/1998 | Scheyer |
| 5,794,635 | A | * | 8/1998 | Maines |
| 5,875,475 | A | * | 1/1999 | Volk |
| 5,890,503 | A | * | 4/1999 | Bowen |

\* cited by examiner

Primary Examiner—Frankie L. Stinson
(74) Attorney, Agent, or Firm—Michael I. Kroll

(57) ABSTRACT

The present invention 10 discloses a portable device for cleaning eyeglasses 16. A transparent enclosure 14 is provided having an upper chamber 18 for cleaning the eyeglasses, a lower left chamber 30 which may be removable for containing the cleaning solution 31 and a lower right chamber housing a pump 36 which is powered by batteries 56 and controlled by a microprocessor 58. The pump 36 circulates cleaning solution 31 through a plurality of apertures 60 in the floor 62 of the upper chamber which creates a spray 64 on the eyeglasses 16. A fan 72 with heating coil 74 then circulates warm air over the eyeglasses 16 in order to dry them.

14 Claims, 11 Drawing Sheets

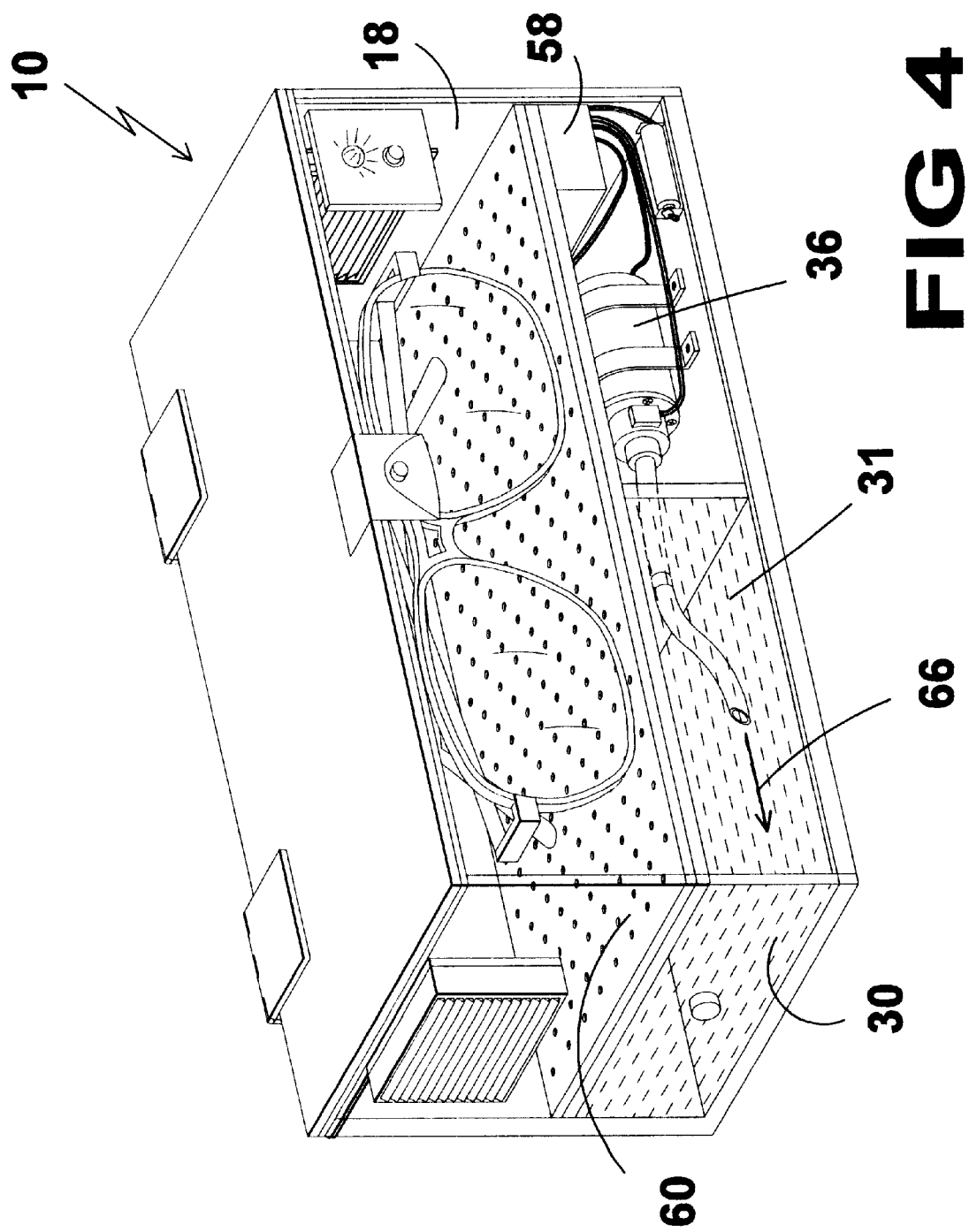

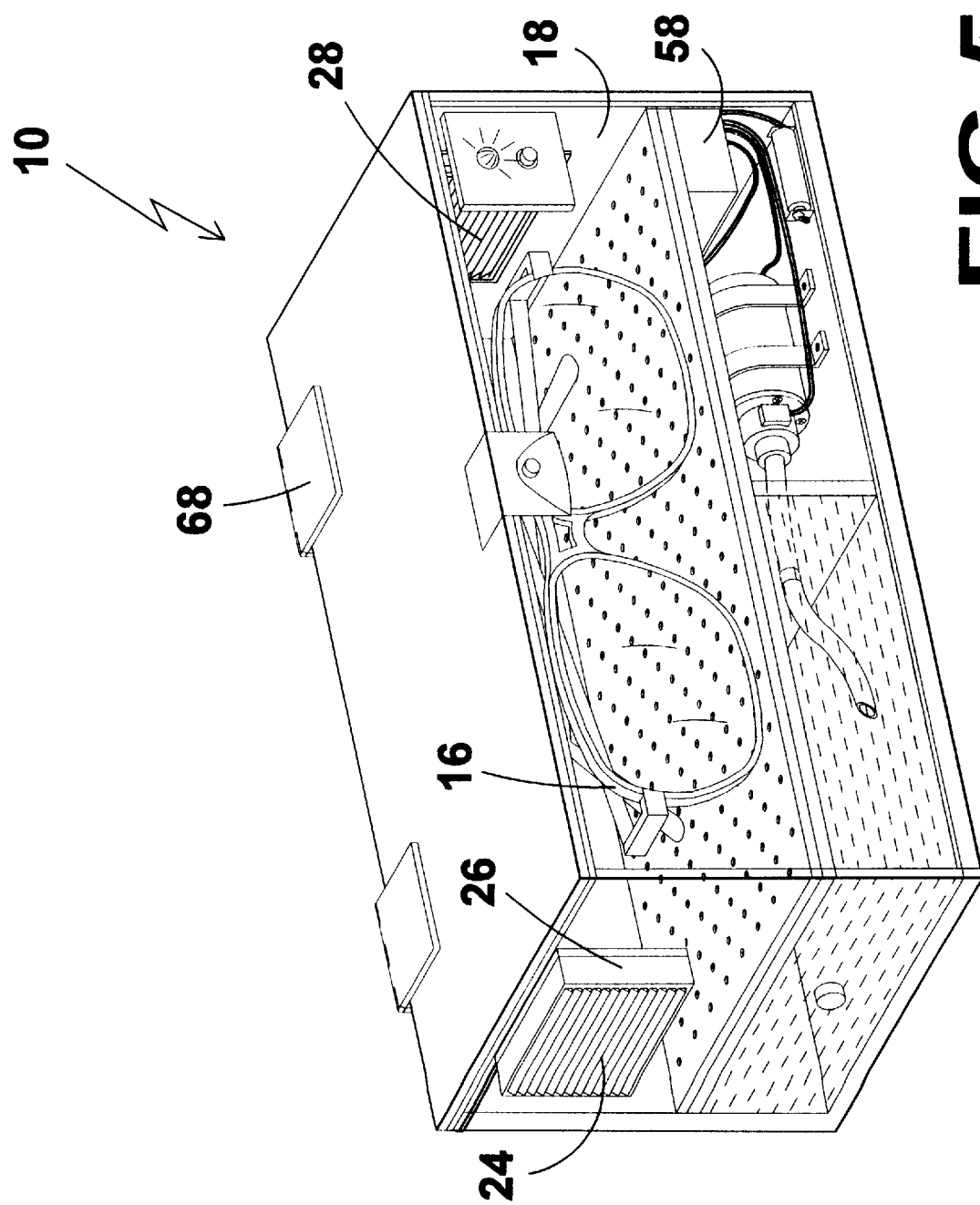

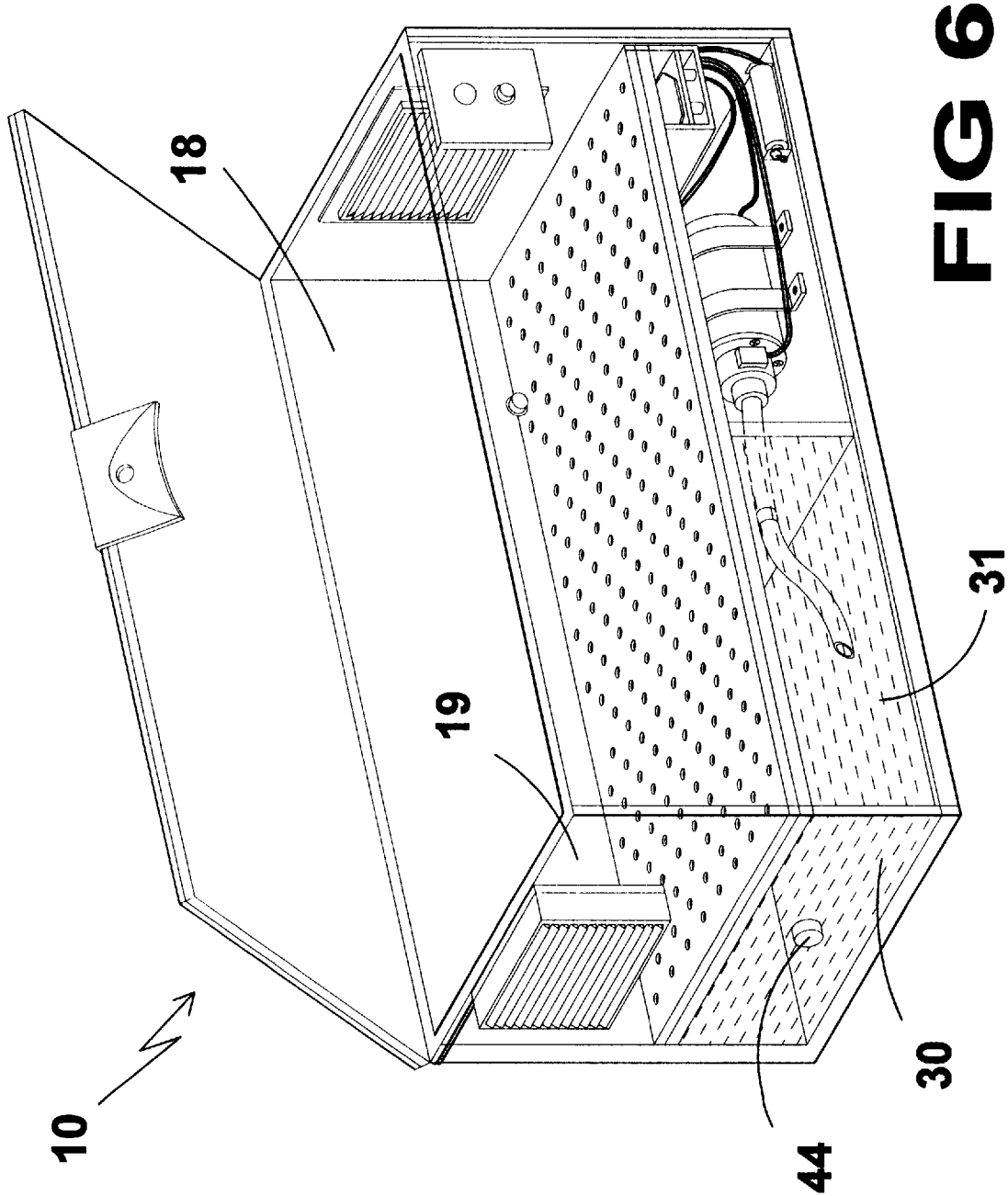

PORTABLE EYEGLASS WASHING SYSTEM

BACKGROUND OF THE INVENTION

1. Field of the Invention

The present invention relates generally to eyeglass cleaning devices and, more specifically, to a portable eyeglass cleaning and sanitizing system providing for the rinsing of eyeglasses in a solution and drying them with heated air within a contained housing.

Eyeglasses are susceptible to smudging and contamination due to dust, lint, sweat, oils, etc. resulting in impaired vision and possibly even optical infection. Conventional methods of cleaning eyeglasses such as wiping them with a cloth or tissue may clear the lenses (albeit with some difficulty if very dirty) but are inefficient and may also introduce other contaminants such as lint. Rinsing eyeglasses with water could be inconvenient or messy, and is ineffective as a sanitizing agent.

The instant invention utilizes a self-contained, portable unit that retains the eyeglasses in a hermetically sealed chamber and sprays the entire eyeglass assembly including lenses, frame and nosebridge with an antibacterial cleaning solution. A high velocity fan propels air past heating coils and the heated air passes through the chamber and over the entirety of the glasses. The instant invention then maintains the cleanliness of the glasses until ready for use by also serving as a protective carrying case. The instant invention can be used anywhere since it is battery operated and has 110V AC and 12V DC power adapters and battery chargers.

2. Description of the Prior Art

There are other eyeglass cleaning devices designed for the cleaning of eyeglasses. Typical of these is U.S. Pat. No. 5,335,394 issued to James W. Cunningham Jr. on Aug. 9, 1994.

Another patent was issued to David H. Bellman et al. on May 11, 1993 as U.S. Pat. No. 5,209,784. Yet another U.S. Pat. No. 3,480,022 was issued to J. W. Richardson on Nov. 25, 1969.

U.S. Pat. No. 5,209,784

Inventor: David H. Bellman

Issued: May 11, 1993

A device/apparatus and a method of cleaning small parts such as for example, jewelry pieces. The jewelry pieces which are to be cleaned are securely positioned or positionable within the main cavity of the apparatus and the walls of the apparatus are made of material and have a form which will permit the cleaning solution, preferably water with a detergent added, to pass through the walls and to impinge on substantially all the surfaces to be cleaned and impinge with sufficient velocity and in sufficient volume, when used within any of the well known types or brands of automatic dishwashers, so as to be effective in the cleaning of the pieces. The apparatus comprises a main cavity for containing jewelry pieces and the walls defining the cavity are adapted to permit the turbulent and high velocity cleaning fluid of an operating automatic dishwasher to impinge on the jewelry pieces contained within the main cavity. There is an access or opening to the main cavity for inserting the jewelry pieces into the main cavity. A cover for the access is provided which is adapted to permit the turbulent and high velocity fluid to impinge on the jewelry pieces and the small parts contained within the main cavity. There is also provided various devices, such as hooks, posts, and compartments into which and onto which various types and sizes of jewelry pieces may be securely and effectively placed and which permits the turbulent and high velocity cleaning fluid to impinge onto each of the jewelry pieces and small parts contained within the main cavity.

U.S. Pat. No. 5,335,394

Inventor: James W. Cunnigham Jr.

Issued: Aug. 9, 1994

An apparatus wherein an oscillating motor and drive shaft arrangement selectively directs an eyeglass pair, and more specifically the lenses thereof, into a cleaning solution, having spherical resilient members therewithin to enhance cleaning. A timer mechanism after a predetermined timed event of cleaning maintains the lenses between front and rear walls of the entrance conduit into the fluid chamber, whereas heated drying air is directed onto the lenses of the eyeglass pair.

U.S. Pat. No. 3,480,022

Inventor: Joseph W. Richardson

Issued: Nov. 25, 1999

Apparatus for cleaning eyeglasses having a bowl containing a suitable cleaning fluid and a centrally mounted, rotatable eyeglass supporting rack. An actuating lever mechanism is provided for lowering and raising the rotating rack and eyeglasses into and out of the cleaning fluid. Suitable and drying rotational speeds are provided by a friction clutch. A portion of the bowl has an interrupted annular concave shape to cause the cleaning fluid to flow upwardly and inwardly over the glasses as they are rotated. An alternate form of the driving mechanism provides automatic raising and lowering of the supporting rack.

While these eyeglass cleaning devices may be suitable for the purposes for which they were designed, they would not be as suitable for the purposes of the present invention, as hereinafter described.

SUMMARY OF THE PRESENT INVENTION

The present invention discloses a portable device for cleaning eyeglasses. A transparent enclosure is provided having an upper chamber for cleaning the eyeglasses, a lower left chamber which may be removable for containing the cleaning solution and a lower right chamber housing a pump which is powered by batteries and controlled by a microprocessor. The pump circulates cleaning solution through a plurality of apertures in the floor of the upper chamber which creates a spray on the eyeglasses. A fan with heating coil then circulates warm air over the eyeglasses in order to dry them.

A primary object of the present invention is to provide a portable device for cleaning and sanitizing eyeglasses.

Another object of the present invention is to provide a portable eyeglass washing device that utilizes a reversible pump to transfer the cleaning solution from the reservoir into the cleaning chamber and back to the reservoir.

Yet another object of the present invention is to provide a portable eyeglass washing device wherein the base of the cleansing chamber has a multiplicity of perforations through which the cleansing solution will be ejected as forceful spray.

Still yet another object of the present invention is to provide a portable eyeglass washing device whereby an electric fan impels air past a heating coil and through the cleansing chamber where the warm air will blow-dry the eyeglasses.

Yet another object of the present invention is to provide a portable eyeglass washing device that is battery operated and has charger/adapters for 110V AC and 12V car cigarette lighters allowing the user to utilize the present invention whenever necessary.

One other object of the present invention is to provide a portable eyeglass washing device that is also a protective travel case for storing the eyeglasses when not in use.

Still another object of the present invention is to provide a portable eyeglass washing device that is simple and easy to use.

Additional objects of the present invention will appear as the description proceeds.

The present invention overcomes the shortcomings of the prior art by providing a compact eyeglass carrying case capable of cleaning and drying the eyeglasses using a pressurized cleaning solution and heated air currents.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 4 is perspective view of the present invention in use. The microprocessor reversed the pump into vacuum mode to drain the solution from the cleansing chamber via the floor apertures. The cleaning solution is then returned to the reservoir where it is stored until the next use.

FIG. 5 is a perspective view of the present invention in use during the drying phase. The microprocessor has unlocked the louvers on the fan intake assembly and the exhaust vent and activated the electric fan and heating coils. The warm air is forced though the chamber and dries the eyeglasses. After 10 seconds the microprocessor shuts down the system and resumes stand-by.

FIG. 6 is a perspective view of the present invention after operation. The eyeglasses have been removed and the cleansing chamber is now empty. The refill drain on the side wall of the reservoir chamber could now be used to change the cleaning solution if deemed necessary.

LIST OF REFERENCE NUMERALS

Figure 1:
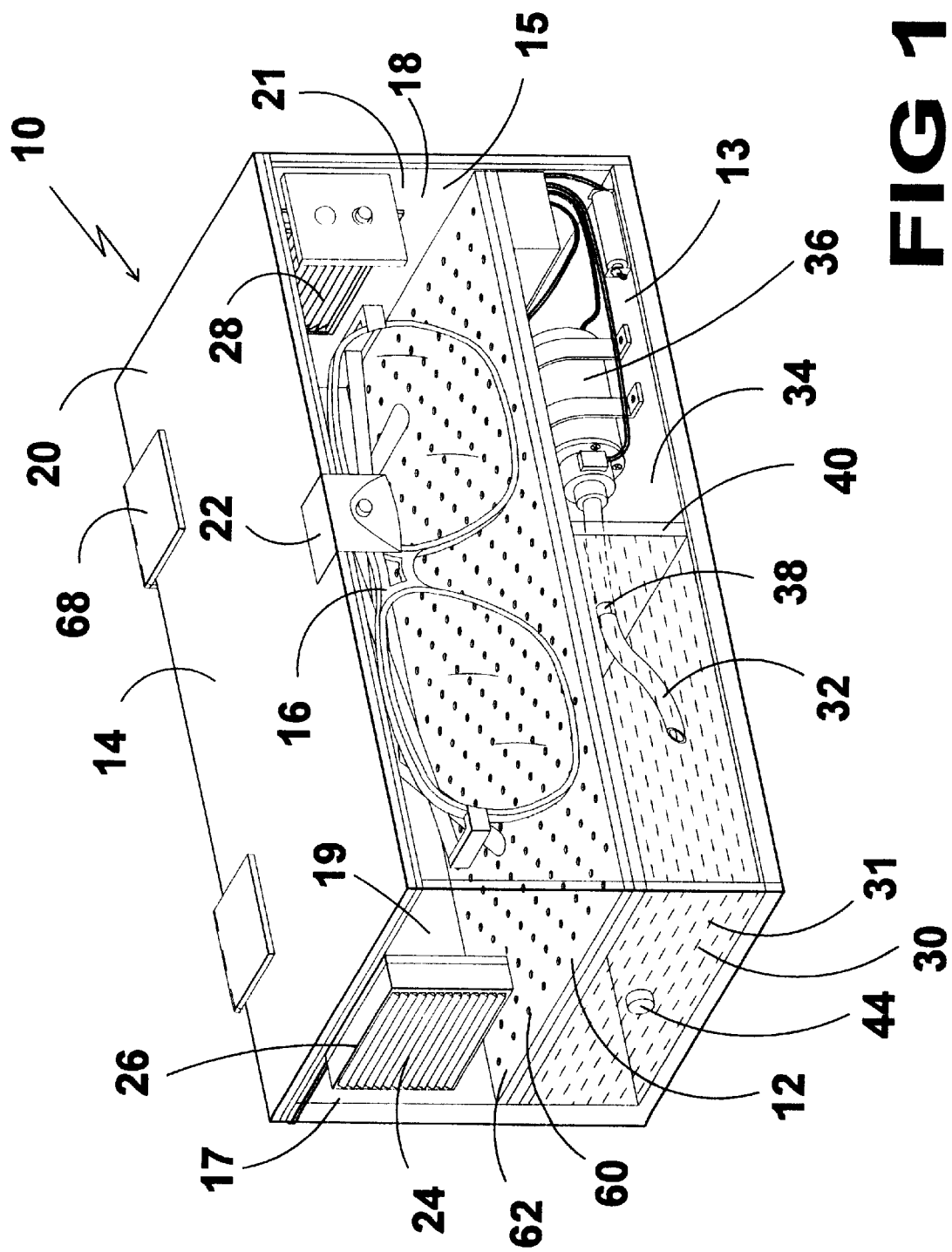
FIG. 1 is a perspective view of the present invention ready for use. The interior chambers are visible through the transparent walls. The eyeglasses are placed inside the cleansing chamber and the top is fastened shut by the latch. The interior louvers for the fan intake assembly located on the left side of the present invention and the exhaust vent on the right side are locked shut so the entire unit is now hermetically sealed. The cleaning solution reservoir is in the lower left chamber and has been filled with an antibacterial solution through the refill drain recess that is capped off. A conduit leads from the reservoir to the pump chamber via a recess in the dividing wall.

With regard to reference numerals used, the following numbering is used throughout the drawings:

10 present invention
12 transparent walls
13 bottom
14 enclosure
15 front side
16 eyeglasses
17 rear side
18 cleaning chamber
19 left side
20 top
21 right side
22 latch
24 intake louvers
26 fan intake assembly
28 exhaust vent
30 cleaning solution chamber
31 cleaning solution
32 conduit
34 pump chamber
36 pump
38 hole
40 wall
42 water tight seal
44 refill drain
46 aperture
48 cap
50 valve
52 start button
54 on light
56 battery
58 microchip
60 floor apertures
62 floor
64 spray of cleaning solution
66 direction arrow
68 hinges
70 interior louvers
72 fan
74 heating coil
76 DC charger sockets
78 AC adapter
80 power source

DESCRIPTION OF THE PREFERRED EMBODIMENT(S)

In order that the invention may be more fully understood, it will now be described, by way of example, with reference to the accompanying drawings in which FIGS. 1 through 9 illustrate the present invention being a portable eyeglass cleaning station.

Turning to FIG. 1, shown therein is a perspective view of the present invention 10 ready for use. The interior chambers are visible through the transparent walls 12 of the rectangular horizontally positioned enclosure 14 defined by a top 20, a bottom 13, a front side surface 15, a rear side surface 17, a left side surface 19 and a right side surface 21. The eyeglasses 16 are placed inside the cleansing chamber 18 and the top 20 is fastened shut by the latch 22. The interior louvers 24 (not visible but see FIG. 7) for the fan intake assembly 26 located on the left side of the present invention 10 and the exhaust vent 28 on the right side are locked shut so the entire unit is now hermetically sealed. The cleaning solution reservoir is in the lower left chamber 30 and has been filled with an antibacterial solution 31 through the refill drain recess 44 that is capped off. A conduit 32 leads from the reservoir 30 to the pump 36 in the pump chamber 34 via a hole 38 in the dividing wall 40. A pair of hinges 68 are provided for operation of the top 20.

Figure 2:
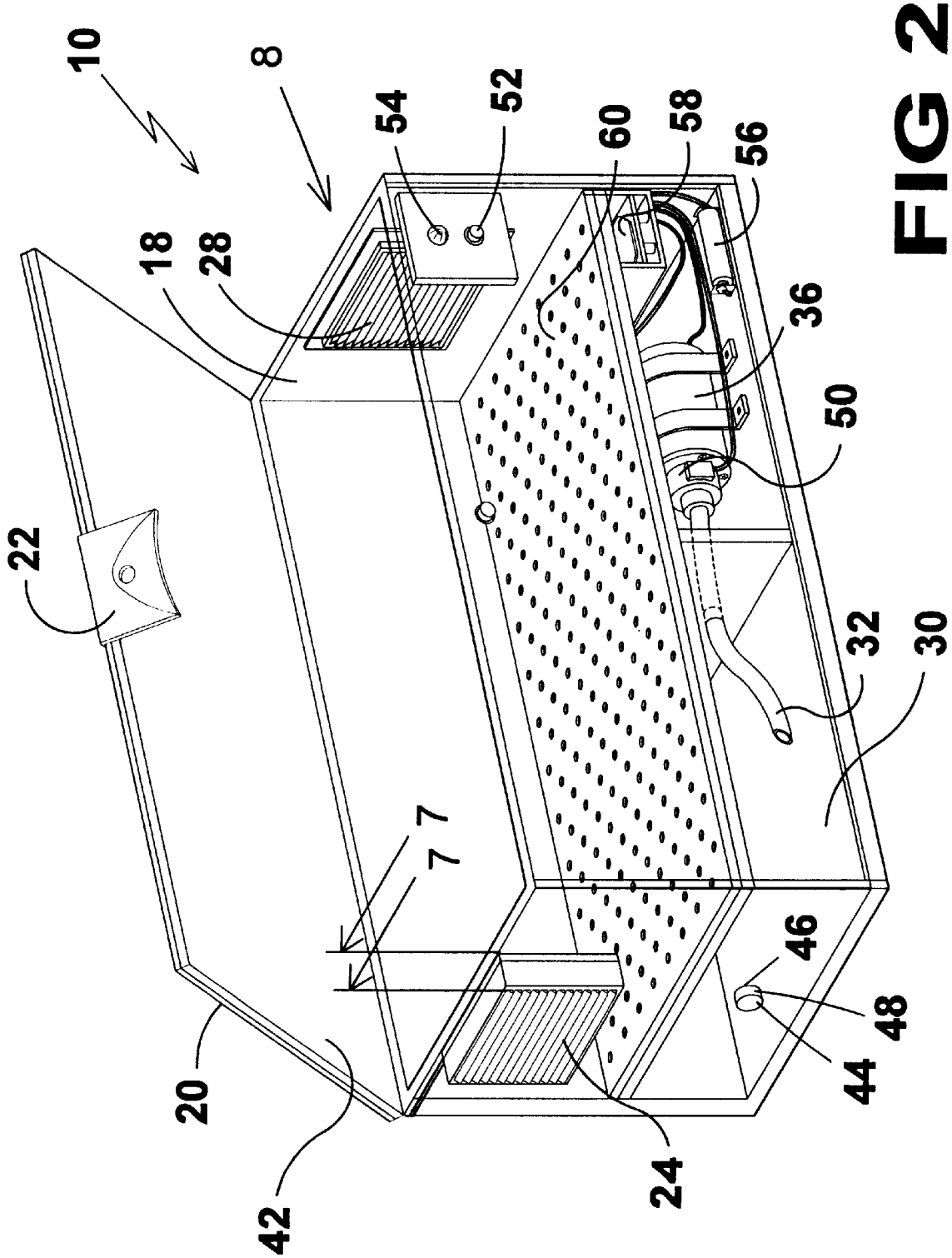
FIG. 2 is a perspective view of the present invention. The reservoir needs to be filled and the eyeglasses inserted in order to be ready for operation.

Turning to FIG. 2, shown therein is a perspective view of the present invention 10. The reservoir 30 needs to be filled and the eyeglasses inserted in order to be ready for operation. The interior chambers are visible through the transparent walls 12 from FIG. 1 of the rectangular enclosure 14. The eyeglasses 16 are placed inside the cleansing chamber 18 and the top 20 is fastened shut by the latch. The intake louvers 24 for the fan intake assembly located on the left side of the present invention 10 and the exhaust vent 28 on the right side are locked shut so the entire unit is now hermetically sealed. The cleaning solution reservoir is in the lower left chamber 30. A conduit 32 leads from the reservoir 30 to the pump 36. Also shown are a water tight seal 42. A refill drain 44 having an aperture 46 with cap 48 is shown in wall 12. A pump valve 50 is shown on pump 36. Also shown are a start button 52 and an "on" indicator light 54. An electrical power supply being, e.g., a AA battery 56 is shown along with a microchip 58 controller. Drain tray 60 is also shown.

Figure 3:
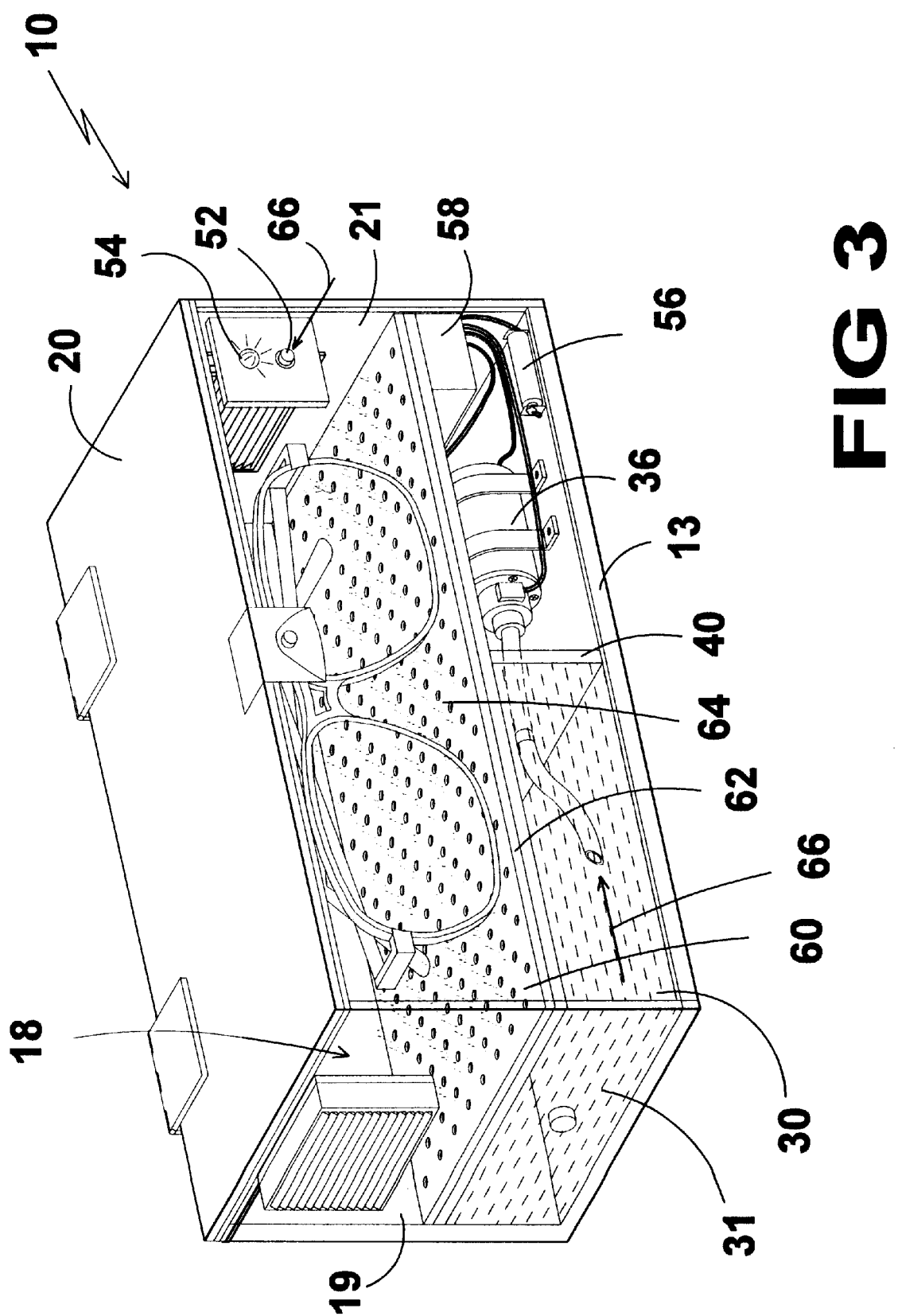
FIG. 3 is perspective view of the present invention in use. The start button was depressed as indicated to activate operation and signaled the microprocessor to send power from the battery to the pump. The light above the start button informs the user that the unit is now active and will not turn off until the entire cleaning cycle is completed. The cleaning solution is being pulled from the reservoir and forced through the apertures located in the floor of the cleansing chamber emitting a spray of cleaning solution throughout the entire chamber for 10 seconds.

Turning to FIG. 3, shown therein is perspective view of the present invention 10 in use. The start button 52 was depressed as indicated by arrow 66 and by light 54 to activate operation and signaled the microprocessor 58 to send power from the battery 56 to the pump 36. The light 54 above the start button 52 informs the user that the unit is now on and will not turn off until the entire cleaning cycle is completed. The cleaning solution 31 is being pulled (see direction arrow 66) from the reservoir 30 and forced through the apertures 60 located in the floor 62 of the cleansing chamber 18 emitting a spray of cleaning solution 64 throughout the entire chamber 18 for 10 seconds. Floor 62 is horizontally positioned approximately intermediate to the top 20 and bottom 13. Wall 40 is positioned approximately intermediate of the left end 19 and right end 21.

Turning to FIG. 4, shown therein is a perspective view of the present invention 10 in use. The microprocessor 58 reversed (see direction arrow 66) the pump 36 into vacuum mode to drain the solution 31 from the cleansing chamber 18 via the floor apertures 60. The cleaning solution 31 is then returned to the reservoir 30 where it is stored until the next use.

Figure 4A:
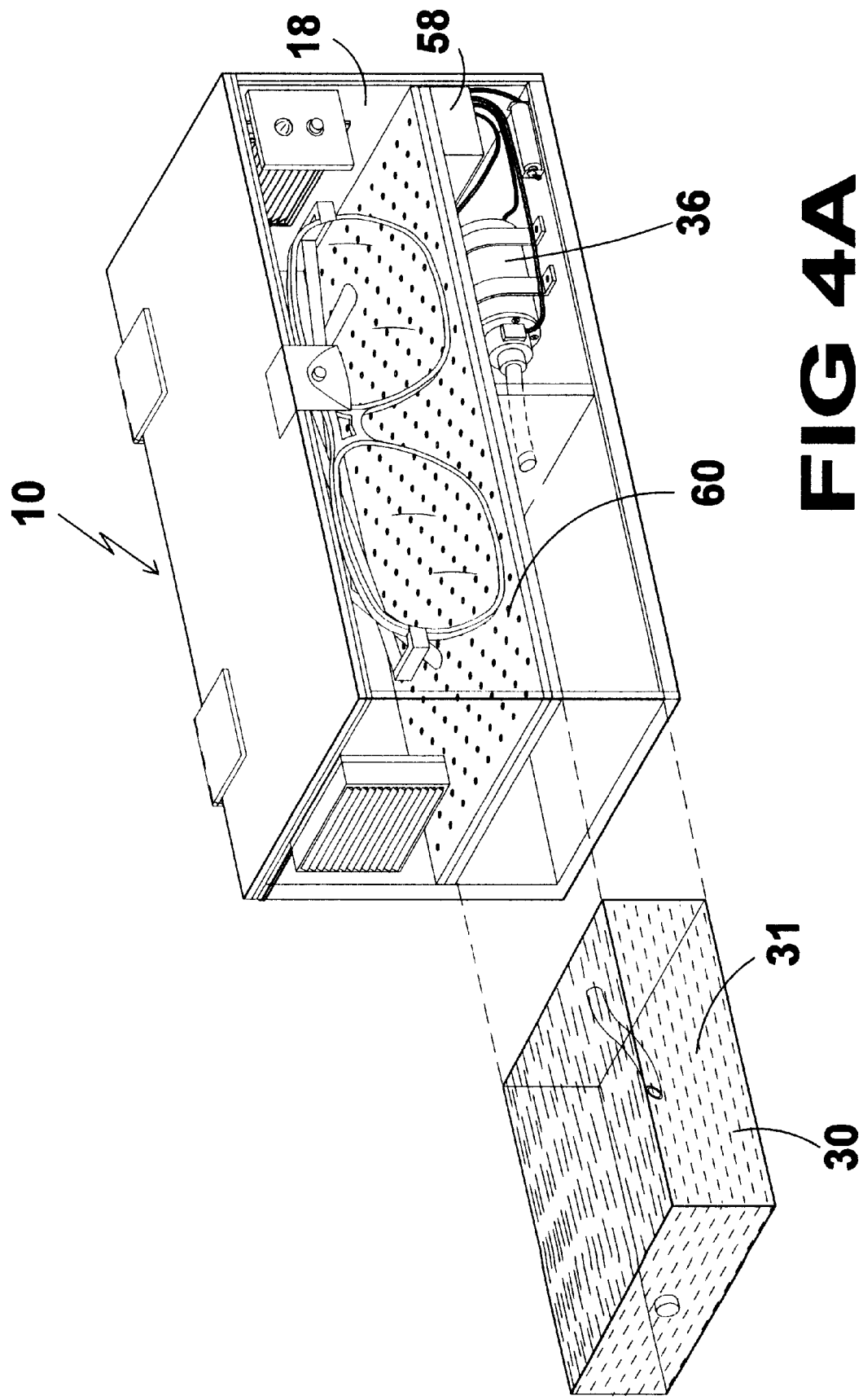
FIG. 4A is a perspective view of the present invention showing the cleaning solution chamber to be a removable/changeable tank.

Turning to FIG. 4A, shown therein is a perspective view of the present invention 10 in use showing the cleaning solution chamber 30 being a removable/changeable tank. Otherwise FIG. 4A is similar to FIG. 4 and shows other features previously disclosed.

Turning to FIG. 5, shown therein is a perspective view of the present invention 10 in use during the drying phase. The microprocessor 58 has unlocked the louvers 24 (not shown) on the fan intake assembly 26 and the exhaust vent 28 and activated the electric fan and heating coils (not shown). The warm air is forced though the chamber 18 and dries the eyeglasses 16. After 10 seconds the microprocessor 58 shuts down the system and resumes stand-by.

Turning to FIG. 6, shown therein is a perspective view of the present invention 10 after operation. The eyeglasses 16 have been removed and the cleansing chamber 18 is now empty. The refill drain 44 on the side wall 19 of the reservoir chamber 30 could now be used to change the cleaning solution 31 if deemed necessary.

Figure 7:
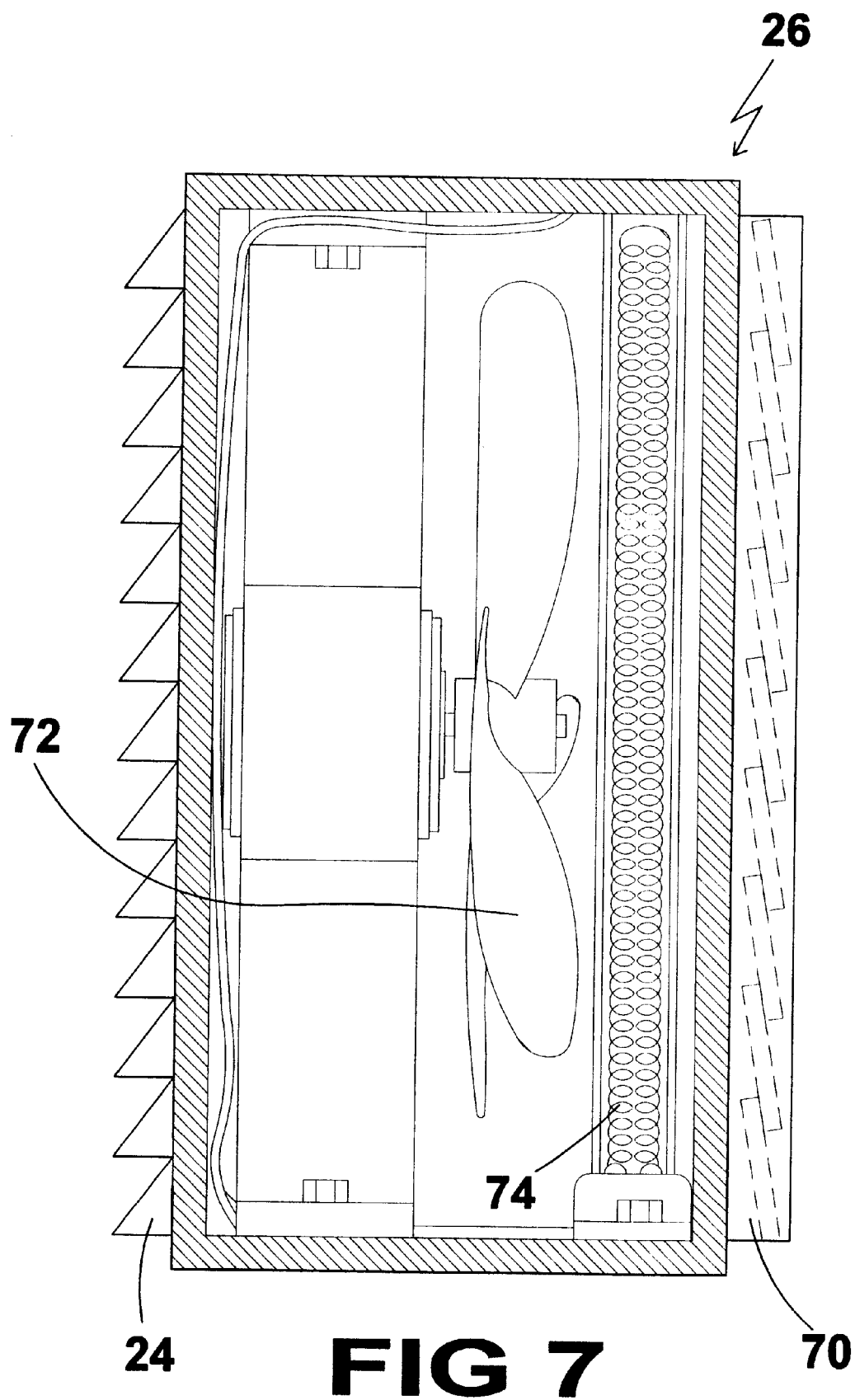
FIG. 7 is a cross-sectional side view of the fan assembly showing the fan and the heating coils in the idle position. The stationary exterior louvers on the left serve to protect the fan assembly. The locking interior louvers are shown in dotted line in the locked position and form a watertight seal as do the locking louvers in the exhaust vent (not shown in this figure). Both sets of locking louvers are released by the microprocessor upon activation of the drying cycle and the fan and heating coils initiate operation propelling warmed air into the cleansing chamber to dry the eyeglasses. Once the drying cycle is completed the microprocessor shuts down the fan and heating coils and locks the louvers down to seal the unit.

Turning to FIG. 7, shown therein is a cross-sectional side view of the fan assembly 26 showing the fan 72 and the heating coils 74 in the idle position. The stationary exterior louvers 24 on the left serve to protect the fan assembly 26. The locking interior louvers 70 are shown in dotted line in the locked position and form a watertight seal as do the locking louvers in the exhaust vent 28 (not shown in this figure). Both sets of locking louvers are released by the microprocessor (not shown) upon activation of the drying cycle and the fan 72 and heating coils 74 initiate operation propelling warmed air into the cleansing chamber to dry the eyeglasses. Once the drying cycle is completed the microprocessor shuts down the fan 72 and heating coils 74 and locks the louvers 70 down to seal the unit.

Figure 8:
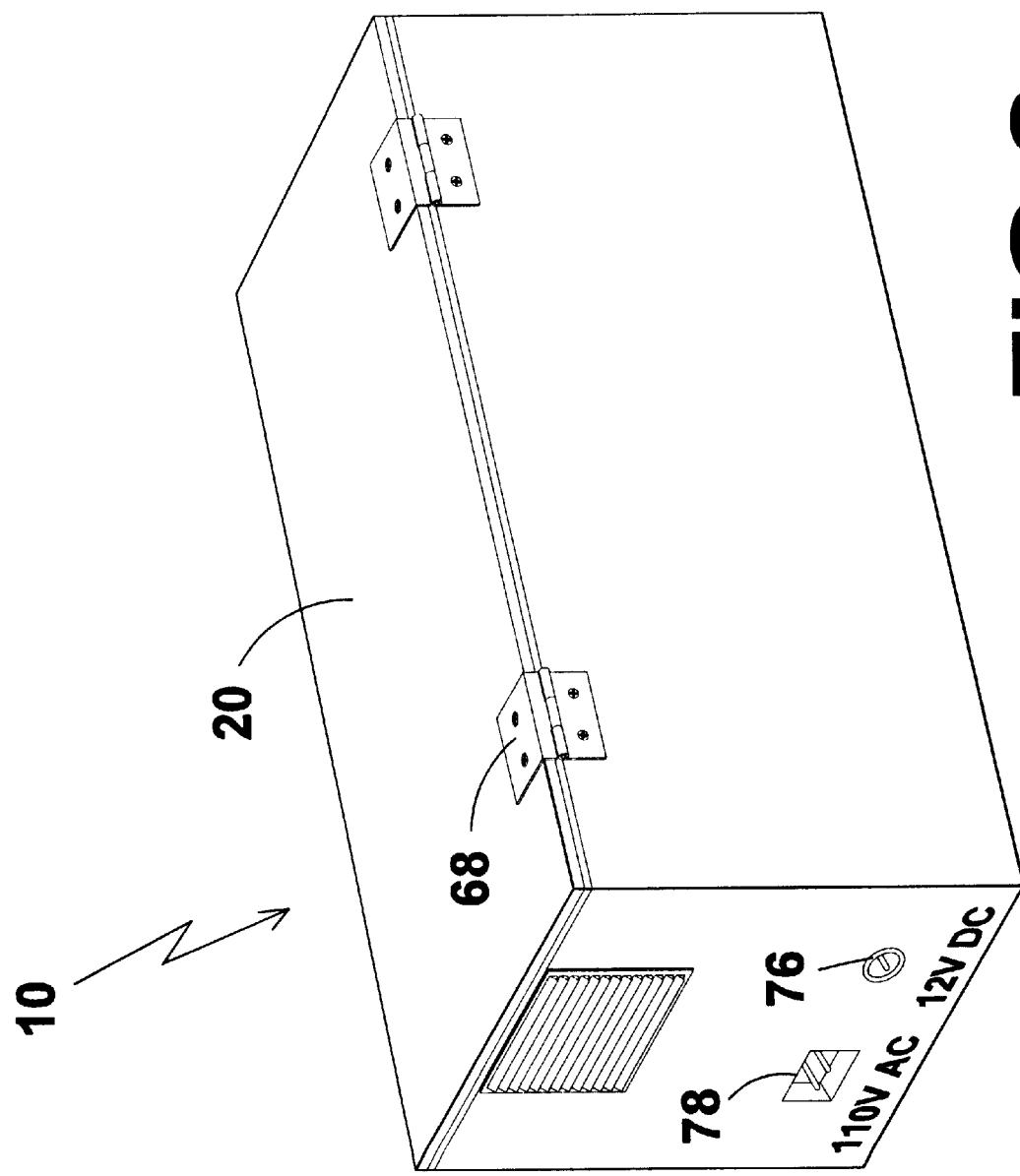
FIG. 8 is a rear perspective of the present invention showing the hinge assembly of the cover and the adapter/charger sockets. The 12 volt adapter/charger would enable the present invention to run or charge off of a standard car cigarette lighter.

Turning to FIG. 8, therein is shown is a rear perspective of the present invention 10 showing the hinge assembly 68 of the cover 20 and the AC adapter 78 and 12 V DC charger sockets 76. The 12 volt adapter/charger would enable the present invention 10 to run or charge off of a standard car cigarette lighter.

Figure 9:
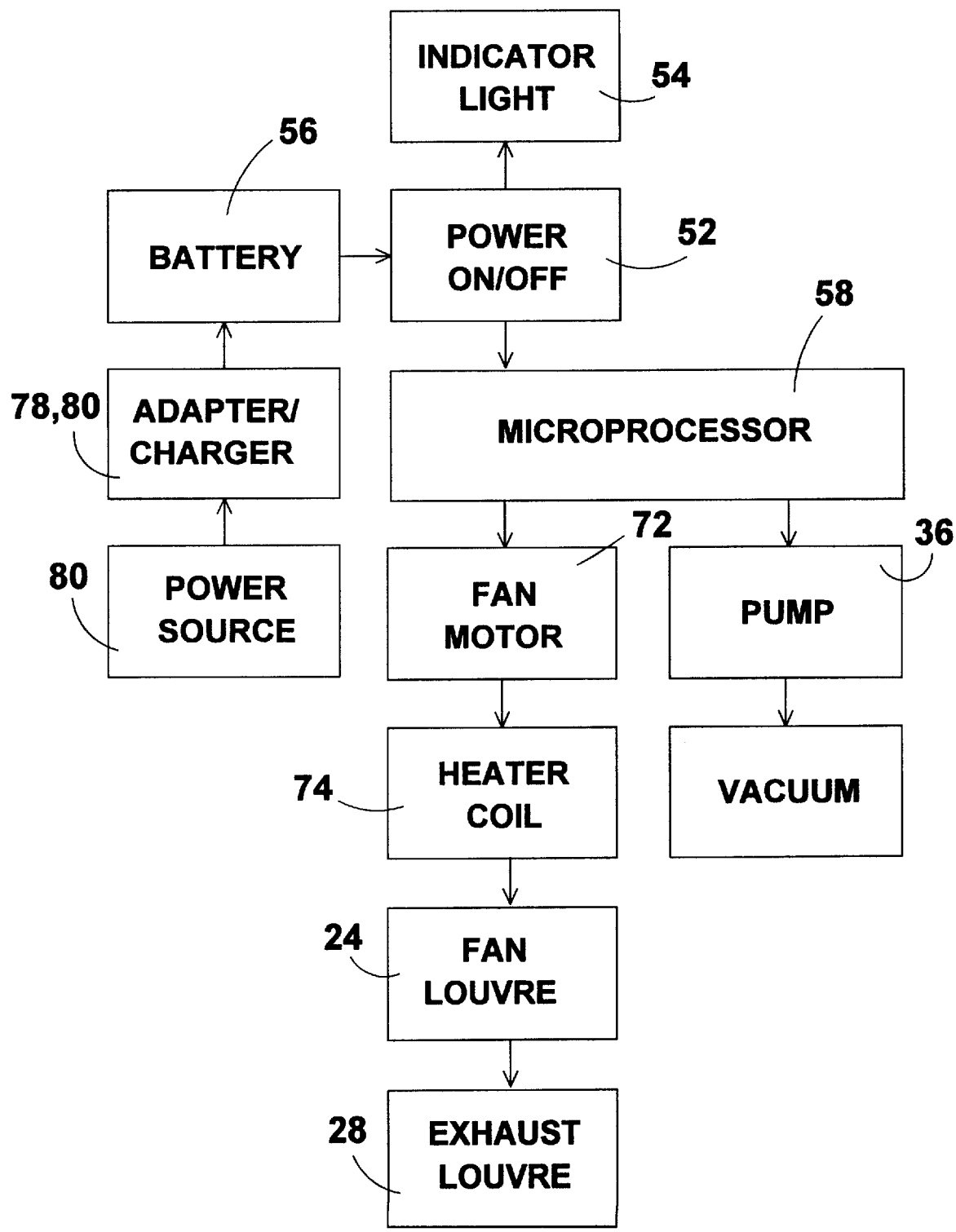
FIG. 9 is a flow chart of the components of the present invention where a power supply comprising batteries having means for recharging the batteries energizes an electrical circuit having switch means for starting and stopping the device. Once the device is started a control device will illuminate a visual indicator that the device is on and will close both the heater louver and the exhaust louver. The control device will actuate a pump which will pump the cleaning fluid from the cleaning fluid compartment through conduit into the glasses cleaning compartment where it will be ejected as a spray through a plurality of holes contained within the floor plate member. Once the wash cycle has been completed the pump will reverse therein removing the glasses cleaning fluid and returning it to its compartment. The control unit will then open the heater louvers and the exhaust louvers. The control unit will energize the fan and the heater. The fan will draw atmospheric air into the device and eject said air across the heating element into the glasses cleaning compartment where it will cause the drying of the glasses before exiting through the exhaust louvers.

Turning to FIG. 9, shown therein is a flow chart of the components of the present invention wherein a power supply 80 comprising batteries 56 having means for recharging the batteries 78, 80 energizes an electrical circuit having switch means 52 for starting and stopping the device. Once the device is started a control device 58 will illuminate a visual indicator 54 that the device is on and will close both the heater louver 24 and the exhaust louver 28. The control device 58 will actuate a pump 36 which will pump the cleaning fluid 31 from the cleaning fluid compartment through conduit into the glasses cleaning compartment where it will be ejected as a spray through a plurality of holes contained within the floor plate member. Once the wash cycle has been completed the pump 36 will reverse therein removing the glasses cleaning fluid and returning it to its compartment. The control unit 58 will then open the heater louvers 24 and the exhaust louvers 28. The control unit 58 will energize the fan 72 and the heater 74. The fan 72 will draw atmospheric air into the device and eject said air across the heating element 74 into the glasses cleaning compartment where it will cause the drying of the glasses before exiting through the exhaust louvers 28.

Figure 10:
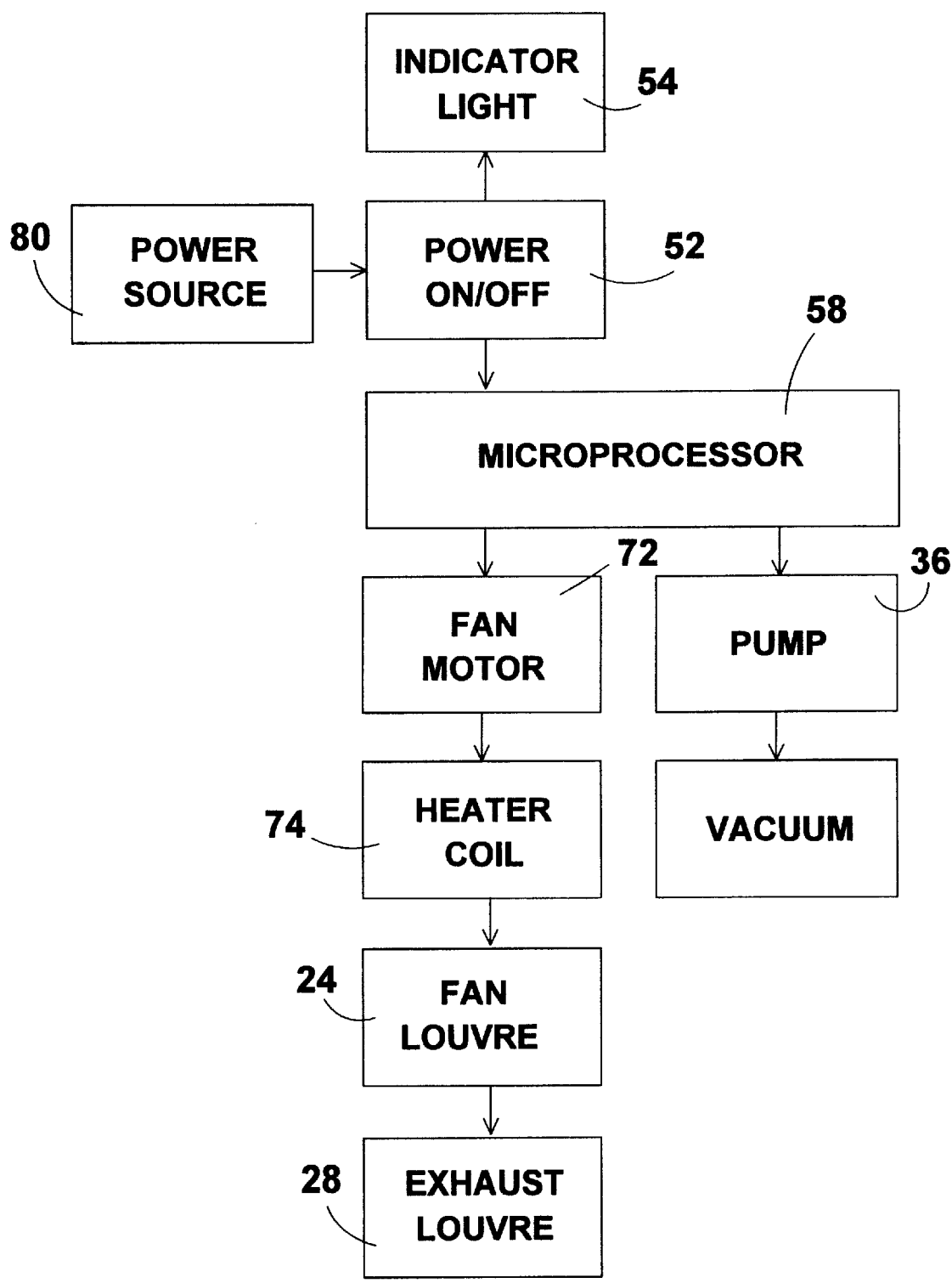
FIG. 10 is a flow chart of the components of the present invention where a power supply comprising a conventional AC source energizes an electrical circuit having switch means for starting and stopping the device otherwise similar to FIG. 9.

Turning to FIG. 10, shown therein is a flow chart of the components of the present invention similar to FIG. 9 wherein a power supply 80 eliminates the battery 56 and the adapter/charger 78 and instead would comprise a conventional AC power source. Other features of FIG. 9 are also shown.

What is claimed to be new and desired to be protected by Letters Patent is set forth in the appended claims:

I claim:

1. An apparatus for cleaning eyeglasses, comprising:
    a) a generally rectangular horizontal enclosure defined by a top surface, a bottom surface, two side surfaces and two end surfaces;
    b) a cleaning solution for cleaning the eyeglasses;
    c) an electrical pump for circulating said cleaning solution through said enclosure;
    d) a generally horizontal planar member disposed approximately intermediate between said top surface and said bottom surface, said planar member forming a floor of an upper cleaning chamber for receiving the eyeglasses to rest unattached on said floor, one of said end surfaces having an air inlet above said planar member and the other end surface having an air outlet above said planar member;
    e) a generally vertical planar member disposed approximately intermediate said two end surfaces, said generally vertical planar member further disposed underneath said floor forming a lower left chamber and a lower right chamber, said lower left chamber for receiving said cleaning solution and said lower right chamber housing for receiving said pump;
    f) a first means for connecting said lower left chamber containing said cleaning solution to said pump;
    g) a second means for connecting said pump to said upper cleaning chamber comprising said floor having a plurality of apertures therein whereby cleaning solution is sprayed on said eyeglasses;
    h) means for drying the eyeglasses after the eyeglasses are cleaned comprising a fan intake assembly mounted on the outside of the end surface having the air inlet and communicating with said air inlet and an exhaust vent mounted on the outside of the other end surface communicating with said air outlet, said fan intake assembly containing a fan and a heating coil, said fan intake assembly having adjustable louvers adjacent the air inlet and said exhaust vent having adjustable louvers adjacent the air outlet;
    i) means for electrically controlling the operation of the apparatus;
    j) a source of electrical power for the apparatus;
    k) means for locking said louvers shut while said glasses are being washed and opening said louvers during drying of said glasses.

2. The apparatus of claim 1, wherein said surfaces of said enclosure are transparent.

3. The apparatus of claim 1, said top surface having means for hingedly mounting on said enclosure whereby said top surface can be opened.

4. The apparatus of claim 3, further comprising said top having a pair of hinges disposes thereon whereby said top can be opened.

5. The apparatus of claim 1, said top surface having a latch thereon for being secured to said enclosure.

6. The apparatus of claim 1, said lower left chamber having an aperture therein for receiving a cap whereby the apparatus can be drained and/or refilled.

7. The apparatus of claim 1, said first means for connecting said lower left chamber to said pump further comprising a conduit communicating between said lower left chamber and said pump.

8. The apparatus of claim 1, said means for controlling the apparatus further comprising a microprocessor for controlling said pump.

9. The apparatus of claim 1, said second means for connecting said pump to said upper cleaning chamber further comprising said pump receiving said cleaning solution from said lower left chamber through said conduit, said pump circulating said cleaning solution through said apertures in said floor, a spray of said cleaning solution being applied to the eyeglasses.

10. The apparatus of claim 1, said source of power further comprising at least one battery.

11. The apparatus of claim 1, said source of power further comprising means for being adapted to AC power.

12. The apparatus of claim 1, further comprising said top having a water tight seal positioned thereon, said seal communicating between said top and said enclosure when said top is in the closed position.

13. The apparatus of claim 1, said source of power further comprising a AC power source.

14. The apparatus of claim 1, wherein said lower left chamber further comprises a tank, said tank being removably attached to said enclosure.

\* \* \* \* \*